United States Patent
Klotz

(10) Patent No.: US 7,535,894 B2
(45) Date of Patent: May 19, 2009

(54) SYSTEM AND METHOD FOR A COMMUNICATION NETWORK

(75) Inventor: Oliver Klotz, Düsseldorf (DE)

(73) Assignee: Nokia Corporation, Espoo (FI)

( * ) Notice: Subject to any disclaimer, the term of this patent is extended or adjusted under 35 U.S.C. 154(b) by 1125 days.

(21) Appl. No.: 10/372,771

(22) Filed: Feb. 26, 2003

(65) Prior Publication Data

US 2004/0165593 A1 Aug. 26, 2004

(51) Int. Cl.
*H04L 12/66* (2006.01)
*H04L 12/56* (2006.01)
*H04J 3/16* (2006.01)
*H04J 1/02* (2006.01)

(52) U.S. Cl. ............ 370/356; 370/392; 370/395.61; 370/400; 370/466; 370/494

(58) Field of Classification Search .......... None
See application file for complete search history.

(56) References Cited

U.S. PATENT DOCUMENTS

| | | | |
|---|---|---|---|
| 5,949,791 A | | 9/1999 | Byers et al. |
| 5,999,529 A | * | 12/1999 | Bernstein et al. ............ 370/376 |
| 6,628,657 B1 | * | 9/2003 | Manchester et al. ...... 370/395.1 |
| 6,636,515 B1 | * | 10/2003 | Roy et al. ................ 370/395.1 |
| 6,782,007 B1 | * | 8/2004 | Redman ..................... 370/509 |
| 6,963,561 B1 | * | 11/2005 | Lahat ........................ 370/356 |
| 6,990,105 B1 | * | 1/2006 | Brueckheimer et al. .. 370/395.5 |
| 7,133,415 B2 | * | 11/2006 | Zelig et al. .................. 370/466 |
| 7,167,465 B2 | * | 1/2007 | Lagrange et al. ............ 370/347 |
| 2001/0017861 A1 | | 8/2001 | Allen et al. |
| 2002/0041604 A1 | | 4/2002 | Ferguson |

FOREIGN PATENT DOCUMENTS

GB    2347304 A    8/2000

OTHER PUBLICATIONS

"ATM Inverse Multiplexing: Time for IMA". Data Communications, McGraw Hill, New York. vol. 25, No. 12, Sep. 1, 1996, pp. 136-138.
Copy International Search Report for PCT Application No. PCT/IB2004/000468.
ITU-T Recommendation I.432.1. "B-ISN user-Network Interface-Physical Layer Specification: General Characteristics." Feb. 1999.

(Continued)

*Primary Examiner*—Melanie Jagannathan
(74) *Attorney, Agent, or Firm*—Foley & Lardner LLP

(57) ABSTRACT

The invention provides a network element and method for handling ATM traffic and TDM traffic. The network element handles TDM traffic carried on ATM cells, and ATM traffic, and comprises generating means for generating new ATM cells for transmitting ATM traffic. At least part of received ATM cells is inserted as payload into newly generated ATM cells. The Network element is connected on the one hand with a network (30) using both TDM traffic carried on ATM cells, and ATM cell traffic, and on the other hand via at least one PDH (PDH=Plesiochronous Digital Hierarchy) transmission line (6) connected with a chain containing at least one second network element (1) using TDM traffic and at least one further network element (20) using ATM traffic. The PDH transmission line (6) carries groups of time slots with TDM traffic and groups of time slots carrying complete ATM cells.

24 Claims, 2 Drawing Sheets

Generating of ATM over ATM to transmit ATM cells via an N x 64 kbit/s Interworking Function

OTHER PUBLICATIONS

ITU-T Recommendation G.704. "Synchronous Frame Structures used at 1544, 6312, 204, 8448 and 44 736 kbit/s Hierarchal Levels." Oct. 1998.

ITU-T Recommendation G.703. "Physical/Electrical Characteristics of Hierarchal Digital Interfaces." Oct. 1998.

Malis, et al. "SONET/SDH Circuit Emulation Service of MPLS (CEM)." Jan. 1997.

The ATM Forum Technical Committee, "ATM on Fractional E1/T1," Oct. 1999.

* cited by examiner

Multiplexing of ATM and TDM traffic to the same PDH line via time slot MUX

PRIOR ART

Generating of ATM over ATM to transmit ATM cells via an N x 64 kbit/s Interworking Function

US 7,535,894 B2

SYSTEM AND METHOD FOR A COMMUNICATION NETWORK

FIELD AND BACKGROUND OF THE INVENTION

The present invention relates to a network element and method for combining ATM (ATM=Asynchronous Transfer Mode) and TDM (TDM=Time Division Multiplexed) traffic on a link, preferably a PDH line (PDH=Plesiochronous Digital Hierarchy), like an E1, T1 or JT1-line, of a communication network.

New mobile networks using ATM transmission, so called third Generation or 3G networks, are built up besides existing GSM networks. GSM networks using TDM transmission are called second generation or 2G networks herein. The 3G network elements will not totally replace the 2G network elements. Both technologies complement one another and may share network infrastructure like transmission lines.

Network elements can be interconnected via star and/or chain topology. The present invention relates to a network comprising a mixed sequence of 2G- and 3G-network elements interconnected via chain topology. That requires a coexistence of ATM-traffic and TDM-traffic on the same line, because the 3G network elements use ATM traffic whereas 2G network elements handle TDM-traffic.

A combined 2G-3G mobile network installed in chain topology and including for instance a sequence of 3G-2G-3G network elements, has coexisting ATM-traffic and TDM-traffic on that line which connects the first 3G-network element performing the port of chain to the networks mean parts and the following 2G network element in the chain. A transmission of ATM and TDM traffic simultaneously over the same physical line (e.g. E1) requires an interface that handles ATM traffic and TDM traffic at the same time.

An unpublished possibility shown in FIG. 1 is to use an additional time slot multiplexer 7 for generating a new frame that contains TDM traffic in some time slots and the content of ATM cells in other time slots of a common frame.

Basically, PDH-interfaces of a 3G-element can be configured either for transmission of ATM cells over an ATM N×64 kbit/s PDH circuit according the recommendation AF-PHY-0130.00 or for tunnelling a N×64 kbit/s circuit through an ATM network by using Circuit Emulation Service (CES) according recommendation AF-VTOA-0078.000.

The ATM Forum recommendation: AF-VTOA-0078.000 "Circuit Emulation Service (CES) Interoperability Specification V 2.0", January 1997, part of the Voice and Multimedia over ATM Specifications, describes the support of Constant Bit Rate (CBR) traffic over ATM-networks. A Structured N×64 and Unstructured DS1/E1/J2 services described herein offer different ways to connect DS1/E1/J2 equipment across emulated circuits carried on an ATM network. The Structured DS1/E1/J2 N×64 service is modelled after a Fractional DS1/E1/J2 circuit. According to this Document an ATM Circuit Emulation Service (CES) Interworking Function (IWF) connects an ATM network via physical interfaces to standard constant bit-rate (CBR) circuits (e.g., DS1/DS3, J2 or E1/E3). The job of a CES Interworking Function is to extend the constant bit-rate circuit to which it is connected across the ATM network. This is done in a manner that is transparent to the terminating equipment of the CBR circuit.

In contrast, the ATM Forum recommendation AF-PHY-0130.00:
"ATM on Fractional T1/E1", part of the Physical Layer Specifications, October 1999, specifies the requirements to map a ATM cell stream on a "circuit-mode connection" made up of an integer number of 64 kbit/s channels up to the maximum number supported on a DS1 or E1 interface.

The transmission convergence sub-layer (TC) is carried on an N×64 kbit/s channel complying with I.231.10 (i.e., it supports octet alignment of an unrestricted octet stream with sequence integrity).

SUMMARY OF THE INVENTION

The present invention uses ATM CES Interworking Function Interfaces (IWF), which provide structured Circuit Emulation Service. In the upstream direction the interfaces (IWF) generate new ATM cells containing the content of defined TDM time slots as payload. In the downstream direction it terminates ATM cells and puts its payload into time slots of PDH frames. All unassigned time slots are filled with an idle pattern.

Further the invention uses ATM over an PDH circuit interface according to document AF-PHY-0130.000 to transmit complete ATM cells over certain time slots of PDH lines. In the downstream direction these interfaces allocate ATM cells each containing a header and payload octet by octet into defined time slots. An ATM idle cell is generated when there is no ATM cell to send. In the upstream direction the interface supports cell delineation and takes the ATM cells out of the PDH frames.

The invention provides comfortable traffic exchange of a network element connected on the one hand with a network using both TDM traffic carried on ATM cells and ATM traffic and on the other hand connected with at least one TDM network element and at least a further ATM network element via at least one PDH transmission line. The PDH transmission line contains time slot groups with TDM traffic and time slot groups with complete ATM cells.

The network element and the method according the invention combines TDM traffic and AM traffic using standarsized interfaces instead a time slot multiplexer.

One aspect of the invention is to use a first common N×64 kBit/s ATM CES Interworking Function Interface for exchange of both the TDM traffic and the ATM traffic via the same PDH transmission line. That interface transmits two groups of time slots. One group transmits the TDM traffic and the other transmits the ATM cell traffic. Each group results in a separated ATM connection providing structured Circuit Emulation Service. Upstream the first CES Interworking Function Interface uses ATM converting means that puts ATM cells originated from an user and to be transmitted via a shared PDH link as payload into Carrier ATM cells.

A preferred embodiment of the invention uses a generic ATM over a PDH circuit interface according Document AF-PHY-0130.00 and a second generic CES Interworking Function Interface providing structured CES to provide the ATM converting means.

The invention shows the advantage that the use of ATM converting means provided by the interfaces is less expensive than the use of an external time slot multiplexer. Several ATM network elements contain multiport line interface cards having several PDH interfaces on the same unit configurable to a CES Interworking Function interface or to an ATM over a PDH circuit interface.

The implementation of the invention enables chaining of ATM network elements and TDM network elements sharing the same PDH link by using an additional standard interface instead a multiplexer.

The invention enables the usage of the network elements more efficiently while removing the need for additional logical elements (such as time multiplexer) from the network.

DETAILED DESCRIPTION OF PREFERRED EMBODIMENTS OF THE INVENTION

Figure 2:
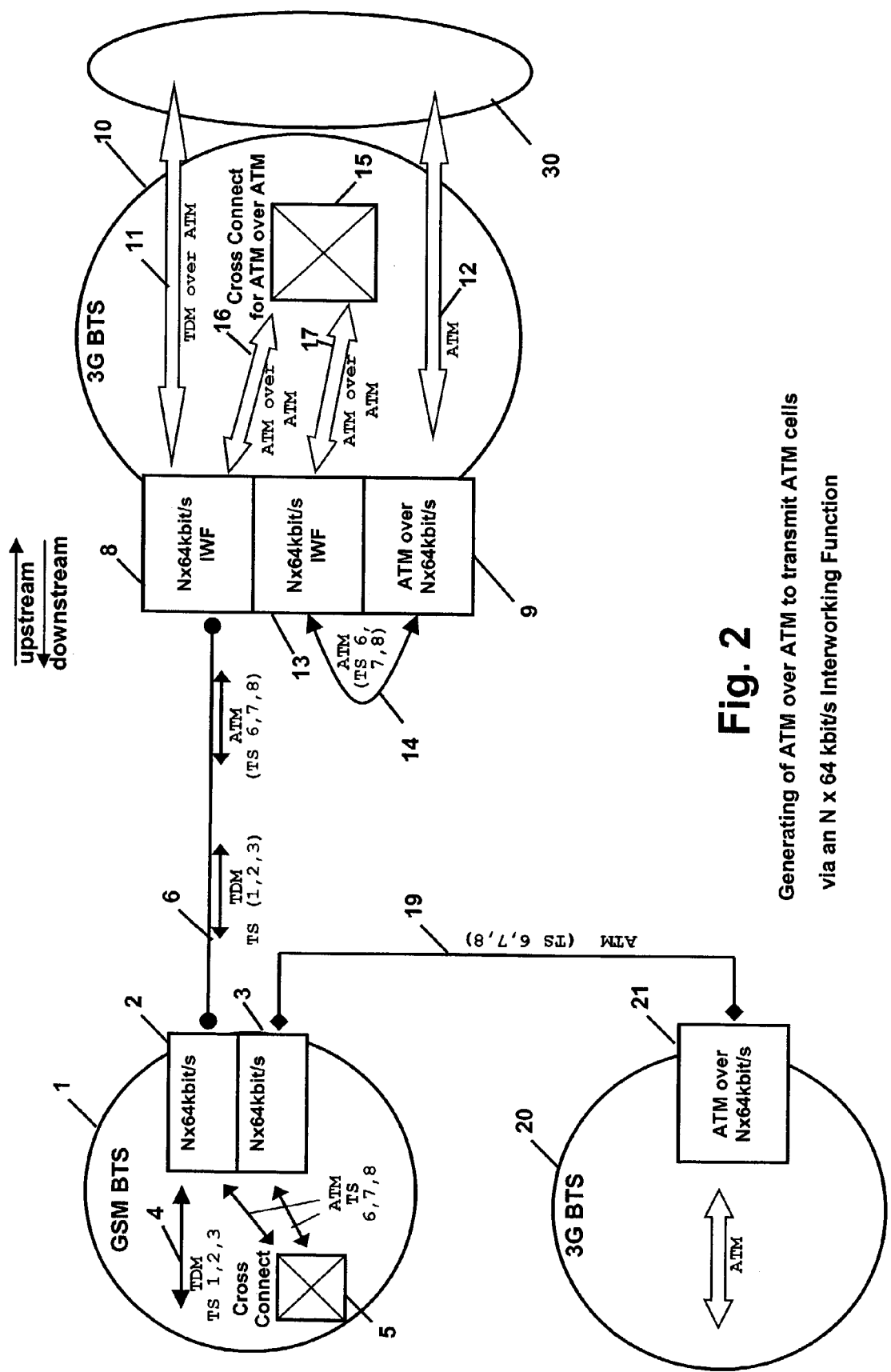
FIG. 2 illustrates an embodiment of the present invention for generating of ATM over ATM to transmit ATM cells via an e.g. N×64 kbit/s Circuit Emulating Service (CES).

Basically, in the present embodiment shown in FIG. 2, a 2G-network having at least a network element 1 is linked via a PDH-line 6 with a 3G-network element 10 that is part of a first 3G-network 30 to exchange 3G ATM cell traffic 12 and 2G TDM traffic 11 carried on ATM cells.

The PDH-line 6 carries TDM-traffic in a first group of time slots destined to exchange with 2G-network element 1 and 2G network elements (not illustrated) connected with the 3G-network 30.

Additionally, the PDH-line 6 carries ATM-traffic in a second group of time slots destined for traffic between the first 3G-network and a second 3G-network or sub-network having at least a 3G-network element 20 that is linked via second PDH-line 19 with the 2G network element 1. In the embodiment, PDH-lines 6 and 19 are E1-lines and all PDH-line interfaces correspond with ITU-T Recommendations G.703 and G.704. However, other PDH-equipment can be utilized as well.

Figure 1:
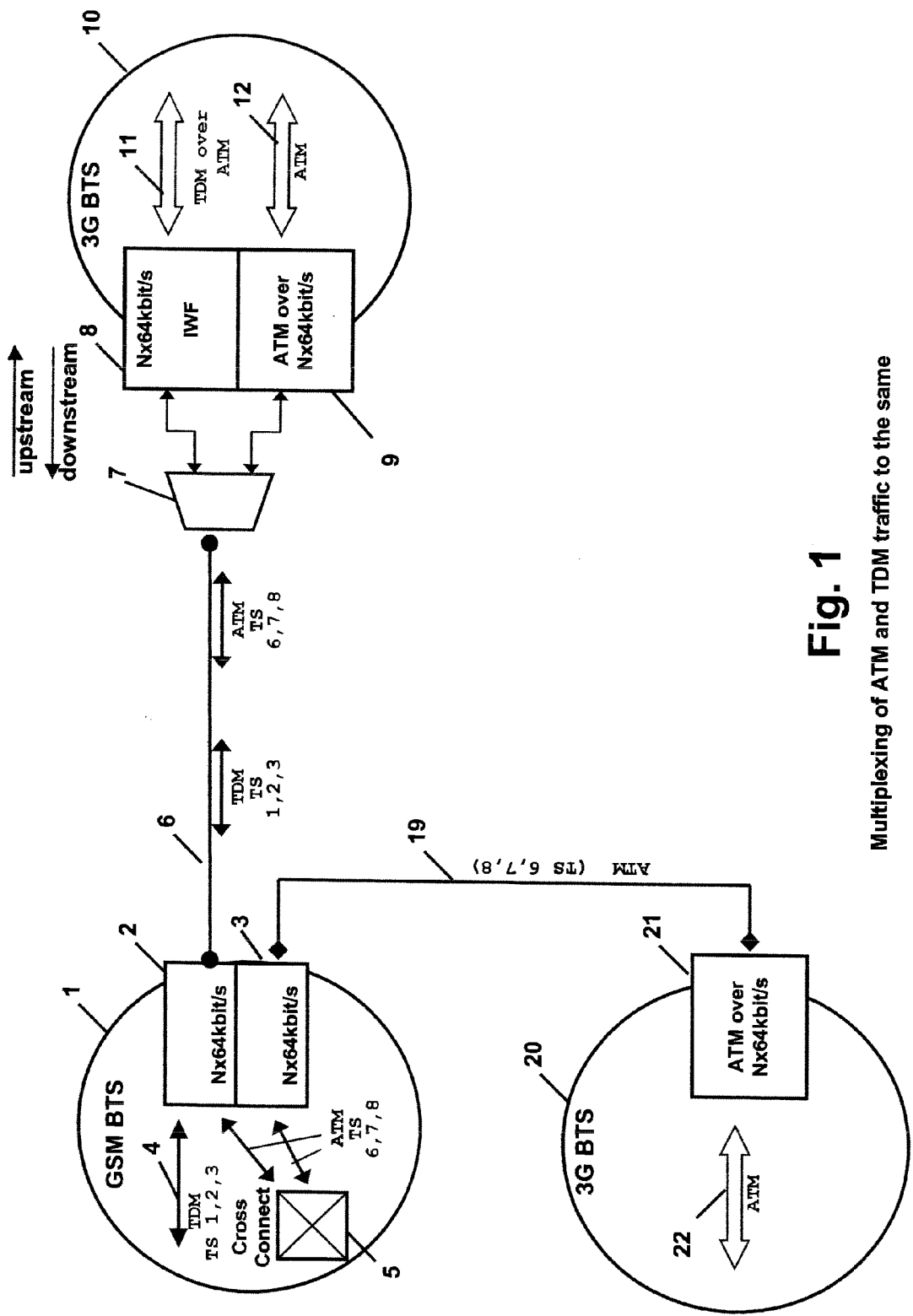
FIG. 1 shows a basic structure of a system for multiplexing of ATM and TDM traffic to the same PDH line via a time slot multiplexer (MUX)

Transmission of ATM and TDM traffic simultaneously over the same physical line requires an interface that can run both modes at the same time. As shown in FIG. 1, an external time slot multiplexer 7 can be used.

The G2-network element 1 is in the present case a GMS-Base station GMS BTS that includes two PDH interfaces 2, 3 for communication with the 3G network elements 10, 20 via PDH lines 6 and 19. The G2-element 1 uses a TDM-communication with internally and externally connected entities, as illustrated by arrow 4.

PDH interface 2 uses two defined time slot groups. For instance, the first group consists of time slot TS1, TS2, TS3 and handles the TDM traffic that is addressed to the G2 network element 1. The second group consists of time slot TS6, TS7, TS8 and forwards the ATM traffic over a N×64 kbit/s Cross Connect device 5, providing cross connection for TS 6, 7, 8, to PDH interface 3.

The 3G-network element 10 includes two interfaces 8 and 9 for communicating with the G2-network element 1.

ATM CES Interworking Function Interface (IWF) 8 is responsible for exchange of TDM traffic 11 over ATM cells coming and destined from or to other not shown 2G network elements and realizes a structured Circuit Emulation Service according to TC-document AF-VTOA-0078.000. In the downstream direction IWF interface 8 terminates ATM cells with a payload containing 2G TDM traffic 11 and places the payload into the predefined first time slot group of PDH frames. All unassigned time slots are filled with an idle pattern. In the upstream direction, interface 8 re-generates new ATM cells containing the content of defined time slots as payload.

F is responsible for exchange of original ATM traffic 12 between 3G-network elements and configured according to document AF-PHY-0130.00 for transmission of ATM cells over certain time slots of the PDH frames. In the downstream direction ATM over a PDH circuit interface 9 allocates complete ATM cells 12 octet by octet into the defined second time slot group. An ATM idle cell is generated when there is no ATM cell to send. In the upstream direction interface 9 supports cell delineation to regenerate the ATM cells received via PDH frames.

An external Time Slot Multiplexer 7 generates in the downstream direction new PDH frames which contain TDM traffic in time slots TS1, TS2, TS3 coming via interface 8 and ATM cells in time slots TS6, TS7, TS8 coming via interface 9.

In the upstream direction Multiplexer 7 de-multiplexes the data stream. Multiplexer 7 and PDH interface 2 are connected via a PDH-line 6, which carries the TDM information in time slots 1, 2, 3, and the ATM cells 12 in time slots 6, 7, 8.

The PDH interface 3 in element 1 is an N×64 kbit/s interface and builds the interconnection to the 3G-network element 20. The interface 3 exchanges the ATM cells carried by the second time slot group with the 3G-network element 20 without providing any ATM functionality.

The 3G network element 20 includes an ATM over a PDH circuit interface 21 for communicating with the pre-arranged network element 1, and uses ATM cell traffic (23) for communication between entities (not illustrated) and from interface 21.

Interface 21 of the 3G-network element 20 is configured in the same way as interface 9 of 3G-network element 10, and is connected with the interface 3 via a PDH-line 19, which transmits ATM cells in time slots.

An important disadvantage of the known solution is the requirement of the external Time Slot Multiplexer 7 at the site of the 3G-network element 10.

FIG. 2 shows an embodiment of the invention that does not require an external time slot multiplexer. The above explanations with regard to the features shown in FIG. 1 likewise apply to those features of the embodiment of FIG. 2 having the same reference numerals as in FIG. 1, unless otherwise stated below.

The invention exchanges both TDM-traffic 11 over carrier ATM-cells coming from G2-network elements and ATM cell traffic 12 coming from G3-network elements on a common interface, (preferably a N×64 kbit/s ATM CES Interworking Function Interface) that provides structured Circuit Emulation Service. To exchange both traffics in one interface it is necessary to transform the ATM cell traffic 12 to ATM cells on carrier ATM cells which is a so-called ATM over ATM.

According to the embodiment of the invention, the 3G-network element 10 includes the generic ATM over a PDH circuit interface 9 for ATM over N×64 kbit/s and an additional ATM CES Interworking Function Interface 13 that provides structured Circuit Emulation Service also.

Additionally, ATM CES Interworking Function (IWF) interface 8 has to be configured for two groups of time slots. One group shall be used for transmission of TDM traffic and the other one shall be used for transmission of ATM cell traffic. Each group results in a separated ATM connection using structured CES.

The 3G network element 10 further comprises a cross connect device 15 switching internal generated ATM over ATM traffic between the interfaces 8 and 13. The arrows 16, 17 indicate the structured CES ATM over ATM traffic between interfaces 9, 13, and the cross connect device 15.

A downstream PDH connection 14 connects the ATM over a PDH circuit interface 9 directly with IWF interface 13.

Since the payload of an ATM cell can consist of 48 octets and the cells that shall be mapped therein have a size including its header of e.g. 53 octets, the original ATM cells will cross the carrier ATM cell boundary.

In the following, handling of TDM traffic is described. ATM cells 11 that are containing TDM traffic that shall be transmitted over the PDH line 6 are terminated at IWF interface 8. So in downstream direction (see arrow "downstream" in FIG. 2) IWF interface 8 puts only the payload of TDM over ATM cells, the TDM-traffic, into the defined time slots (e.g. TS 1, 2, 3). In upstream direction (see arrow "upstream" in FIG. 2) IWF interface 8 takes the TDM content of defined time slots (e.g. TS 1, 2, 3) out of the PDH-frames and put them as payload into regenerated ATM cells.

In the following, handling of ATM traffic is described. To transmit ATM cells over the ATM CES Interworking Function interface 8 the additional ATM CES Interworking Function Interface 13 puts in the downstream direction the complete original ATM cell traffic 12 that shall be transmitted to network element 1 as payload into carrier ATM cells 16. Therefore, PDH circuit interface 9 and IWF interface 13 convert the original ATM cell traffic 12 to carrier ATM cells 16 with the same carrier format as the TDM traffic 11 coming from network 30. That has the advantage, that IWF interface 8 can process both traffics in the same way for converting from ATM to PDH or from PDH to ATM, respectively. According its standard function IWF interface 8 transmits both traffics without ATM carrier cells via PDH line 6.

The ATM cell traffic over carrier ATM cells in the downstream direction is generated as follows. ATM over a PDH circuit Interface 9 arranges the complete ATM cells in certain time slots of PDH frames in connection 14 by mapping the original ATM cells octet by octet into the defined time slots (e.g. TS 6, 7, 8). According ITU-T Recommendation I.432.1 interface 9 generates ATM idle cells in case that there are no original ATM cells to send.

The downstream arranged IWF Interface 13 puts the defined time slots TS 6, 7, 8 from PDH connection 14 with original ATM cells as payload into new generated Carrier ATM cells. Thus, "ATM over ATM" 17 is provided for the downstream path.

The cross connect device 15 connects the Carrier ATM cells 17 generated in ATM IWF interface 13 to ATM IWF interface 8 where they are terminated and the contained original ATM cells are unpacked and inserted into the defined time slots TS 6, 7, 8 of PDH line 6.

In the upstream direction IWF interface 8 puts the content of all incoming PDH frames into Carrier ATM cells. The content of time slots TS 1, 2, 3 is converted to TDM traffic 11 over ATM; whereas the time slots TS 6, 7, and 8 containing the original ATM cells 12 as payload are converted to ATM over ATM 16.

Because Cross Connect 15 connects the Carrier ATM cells "ATM over ATM" 16 to IWF interface 13, they are terminated and the original ATM cells are unpacked and inserted into the defined time slots of PDH connection 14.

In upstream direction the ATM over a PDH circuit interface 9 provides cell delineation over the defined time slots. The received original ATM cells is regenerated to ATM cell traffic 12.

It is an advantage of the invention when the interfaces 8, 9, 13 are provided by a common line interface unit that contains several programmable PDH interfaces on each interface unit that may be set-up either in ATM mode (transmission of ATM cells over PDH frames) or ATM IWF mode providing Circuit Emulation Service by software programming. So the invention can be realized by a minimum of additional hardware equipment.

The above described technique provides chaining of 3G network elements like 3G base stations and 2G network elements like GSM base stations, by combining ATM cells with TDM traffic on a common PDH link.

The use of "ATM over ATM" is less expensive than the use of the external time slot multiplexer 7.

It is an advantage of the invention that all means for connecting 3G and 2G network elements in chain can be implemented by using redundant hardware components and software settings inside a 3G network element 10. Network element 10 is on the one hand connected with the 3G network 30 using ATM and sharing its transport capacities with established 2G network elements wherein TDM traffic is carried on ATM cells. The TDM traffic carried on ATM cells is carried to and from this network 30 via path 11, and the ATM traffic is carried to and from this network 30 via path 12. The network 30 may consist of a single network connected with 2G and 3G network elements, or may comprise several Sub-networks with 2G and/or 3G network elements.

On the other hand, the network element 10 is connected via the at least one PDH transmission line 6 with a chain containing at least one second network element 1 using TDM traffic and at least one further network element 20 using ATM traffic.

The ATM IWF Interface 8, converting ATM-cells into PDH-Frames and vice versa, not only transports the "TDM traffic on carrier ATM cells" (standard function) but also the "original ATM cell traffic".

Contrary to interface 9, the interface 8 suppresses, downstream, the ATM cell headers of ATM cells 11, 16 when framing the ATM cells to PDH frames. The "ATM over PDH circuit interface" interface 21 in 3G element 20 has to regenerate the original ATM cells with an original header from the time slots TS 6 to 8 of the received PDH frames. In element 10 it is ensured that the complete ATM cells including headers are supplied to the interface 21 (Tunnelling of ATM cells over PDH line). This is achieved by the second "ATM over PDH circuit interface" interface 9, which converts (or frames) the "original ATM cell traffic" 12 as complete cells into PDH frames on connection 14. In order to add the respective time slots on the upstream side 1 to the ATM IWF Interface 8 in accordance with the proposed architecture, the converter function of interface 8 for the already framed original ATM cells is compensated by bringing these cells into the carrier ATM cells 17. The interfaces 8 and 13 are the same but are operated opposite to each other. Interface 13 generates the ATM header, which the interface 8 forcibly removes again, and vice versa, according to the disclosed architecture.

Likewise, the interfaces 9 and 21 are identically configured and arranged in opposite directions. Original ATM cell traffic 12 is transferred via parts of PDH frames (TS 6-8) to element 20 and arrives there as the original ATM cell traffic 22 again, and vice versa.

All interfaces 8, 9, 13 (and 21) preferably are identical hardware elements and may practically be implemented as an n-fold (8-fold) IC. The configuring is achieved by software. Thus the additional interface 13 can be provided on the circuit board as a redundant part, at practically no additional costs. Link 14 need not be a cable. A signal line or the like on or in the card or circuit board is also sufficient.

The PDH transmission line 6 carries groups of time slots with TDM traffic and groups of time slots carrying complete ATM cells. The network element 10 comprises the common N×64 kBit/s Circuit Emulation Service Interworking Function Interface 8 for exchange the TDM traffic and the ATM cells via the same PDH transmission line 6.

An ATM converting means 9, 13 is provided that puts ATM cells originated from an user as payload into Carrier ATM cells for transmitting over the Circuit Emulation Service Interworking Function Interface 8. The converting means contains the first generic interface 9 for ATM over N×64 kbit/s and the second generic CES Interworking Function Interface 13 providing structured Circuit Emulation Service. The second generic CES Interworking Function Interface 13 inserts ATM cells received via the first generic interface 9 from the network as payload into newly generated ATM cells, for transmitting ATM cells via the common N×64 kBit/s Circuit Emulation Service Interworking Function Interface 8 to the PDH transmission line 6.

The network element 10 can perform a base station, a router or a server in ATM equipment.

The invention provides additionally a method and a system for handling ATM traffic and TDM traffic in the network element.

The network element, e.g. base station, generates new ATM cells for transmitting ATM traffic. At least part of received ATM cells is inserted as payload into newly generated ATM cells. The network element includes an interface, which provides an Interworking Function. Transmitted ATM cells are received in upstream path of the interface, which places defined time slots as payload into newly generated ATM cells. The newly generated ATM cells are cross-connected to another interface where they are terminated, and ATM cells are unpacked and inserted into defined time slots.

Although preferred embodiments have been described above, the invention is not limited thereto and may also be implemented in networks of different types.

The invention claimed is:

1. An apparatus configured for handling time division multiplex (TDM) traffic carried on asynchronous transfer mode (ATM) cells, and ATM traffic, comprising:
   a first interface configured to exchange the TDM traffic and the ATM traffic via a same plesiochronous digital hierarchy transmission line; and
   a second interface configured to insert an ATM cell received from a network as payload into a newly generated carrier ATM cell, the second interface being configured to generate an ATM header for the carrier ATM cell,
   the first interface being configured to remove the ATM header generated by the second interface when framing the ATM cells to plesiochronous digital hierarchy frames for transmitting over the plesiochronous digital hierarchy transmission line.

2. An apparatus according to claim 1, wherein the apparatus is connected on one hand with a network using both TDM traffic carried on ATM cells, and ATM cell traffic, and on the other hand via at least one PDH (Plesiochronous Digital Hierarchy) transmission line connected with a chain containing at least one second network element using TDM traffic and at least one further apparatus using ATM cell traffic, wherein the PDH transmission line carries groups of time slots with TDM traffic and groups of time slots carrying complete ATM cells.

3. An apparatus according to claim 1, comprising an ATM converting means which places ATM cells originated from an user as payload into carrier ATM cells for transmitting over the first interface.

4. An apparatus according to claim 3, wherein the ATM converting means contain an ATM over PDH circuit interface for transmitting of ATM cell traffic over a PDH link and the secondinterface providing structuredcircuit emulation service.

5. An apparatus according to claim 4, wherein the second interface inserts ATM cells received via the ATM over a PDH circuit interface from a network as payload into newly generated carrier ATM cells, for transmitting ATM cell traffic via the firstinterface to the PDH transmission line.

6. An apparatus according to claim 4, wherein the interfaces place information of ATM cells received in an upstream path of interfaces and contained in defined time slots on the PDH link, as payload into the newly generated carrier ATM cells.

7. An apparatus according to claim 4, wherein the ATM over a PDH circuit interface and a second ATM Circuit Emulation Service Interworking Function Interface are interconnected by a PDH link.

8. An apparatus according to claim 1, wherein the first and second interfaces and the ATM over a PDH circuit interface are interface devices alternatively configurable either for transmission of ATM cells over an ATM N×64 kbit/s PDH circuit or for tunneling a N×64 kbit/s circuit through an ATM network by using Circuit Emulation Service.

9. An apparatus according to claim 1, wherein the apparatus is a base station in a mobile network.

10. An apparatus according to claim 1, comprising a cross connect device which cross connects newly generated carrier ATM cells to an ATM Circuit Emulation Service Interworking Function Interface where termination takes place, and ATM cells are unpacked and inserted into defined time slots on the PDH transmission line.

11. An apparatus according to claim 1, wherein an interface of the network element is configured for two groups of time slots, one group being used for transmission of TDM traffic and the other group being used for transmission of ATM cell traffic.

12. A communication system for transmitting information between network elements in form of packets carrying TDM and ATM traffic, comprising an apparatus according to claim 1.

13. An apparatus according to claim 1, wherein at least on of the first and second interface is an ATM circuit emulation service interworking function interface.

14. A method for handling time division multiplex (TDM) traffic carried on asynchronous transfer mode (ATM) cells, and ATM cell traffic in an apparatus, comprising:
   exchanging, by a first interface, the TDM traffic and the ATM traffic via a same plesiochronous digital hierarchy transmission line; and
   inserting, by a second interface, an ATM cell received from a network as payload into a newly generated carrier ATM cell, comprising generating an ATM header for the carrier ATM cell;
   removing by the first interface the ATM header generated by the second interface when framing the ATM cells to plesiochronous digital hierarchy frames for transmitting over the plesiochronous digital hierarchy transmission line.

15. A method according to claim 14, wherein the apparatus is connected on the one hand with a network using both TDM traffic carried on ATM cells, and ATM cell traffic, and on the other hand via at least one PDH (Plesiochronous Digital Hierarchy) transmission line connected with a chain containing at least one second apparatus using TDM traffic and at least one further apparatususing ATM cell traffic, wherein the PDH transmission line carries groups of time slots with TDM traffic and groups of time slots carrying complete ATM cells.

16. A method according to claim 15, comprising a common ATM Circuit Emulation Service Interworking Function for exchange of the TDM traffic and the ATM cells via the same PDH transmission line.

17. A method according to claim 14, wherein an ATM conversion is used that places ATM cells originated from a user as payload into Carrier ATM cells for transmitting over an Circuit Emulation Service Interworking Function.

18. A method according to claim 14, wherein a CES Interworking Function inserts ATM cells received via an ATM over a PDH circuit interface from the network as payload into newly generated ATM cells, for transmitting ATM cells via the common Circuit Emulation Service Interworking Function to the PDH transmission line.

19. A method according to claim 18, wherein information of ATM cells received in an upstream path of the interface and contained in defined time slots, is inserted as payload into newly generated ATM cells.

20. A method according to claim 14, comprising a step of cross connecting newly generated carrier ATM cells to an interface at which termination occur, and ATM cells are unpacked and inserted into defined time slots.

21. A method according to claim 14, wherein, in one direction, information of defined time slots of ATM cells is inserted as payload into newly generated ATM cells.

22. A method in accordance with claim 21, wherein the one direction is upstream.

23. A method according to claim 14, providing cross connection of carrier ATM cells between interfaces.

24. An apparatus, comprising:
  means for handling time division multiplex, TDM, traffic carried on asynchronous transfer mode, ATM, cells, and ATM traffic,
  means for exchanging of the TDM traffic and the ATM traffic via a same plesiochronous digital hierarchy transmission line, and
  means for inserting an ATM cell received from a network as payload into a newly generated carrier ATM cell, and for generating an ATM header for the carrier ATM cell, and
  means for removing the ATM header generated by the means for inserting, when framing the ATM cells to plesiochronous digital hierarchy frames for transmitting over eh plesiochronous digital hierarchy transmission line.

\* \* \* \* \*